April 6, 1954  J. W. KIRKPATRICK  2,674,182
FRUIT JUICE EXTRACTOR
Filed June 22, 1950  2 Sheets-Sheet 1
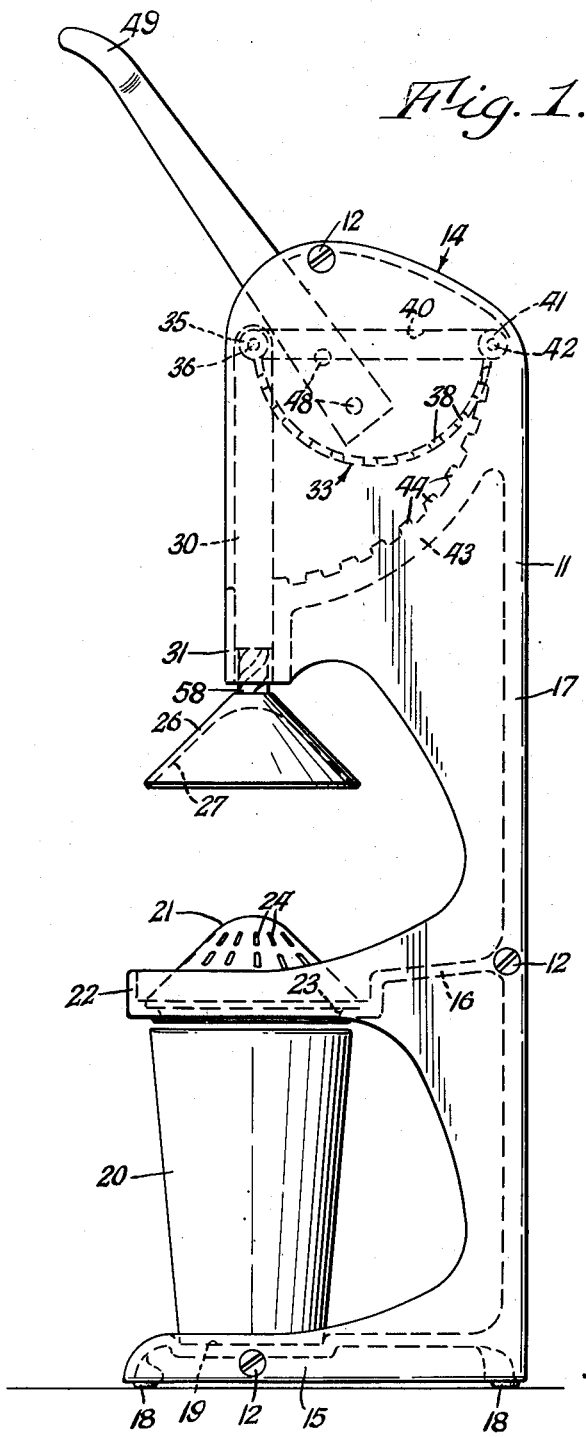
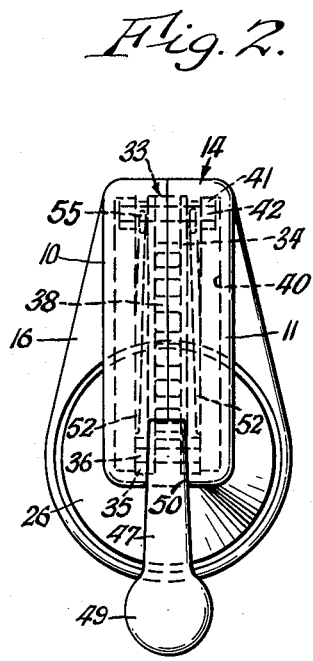
INVENTOR.
Joseph W. Kirkpatrick
BY
Popp and Sommer
Attorneys.

April 6, 1954

J. W. KIRKPATRICK 2,674,182

FRUIT JUICE EXTRACTOR

Filed June 22, 1950

INVENTOR.
Joseph W. Kirkpatrick
BY
Popp and Sommer
Attorneys.

Patented Apr. 6, 1954

2,674,182

UNITED STATES PATENT OFFICE 2,674,182

FRUIT JUICE EXTRACTOR

Joseph W. Kirkpatrick, Buffalo, N. Y.

Application June 22, 1950, Serial No. 169,702

5 Claims. (Cl. 100—288)

This invention relates to juice extractors and particularly to manually operated juice extractors such as are used in the kitchen of a household or in restaurants, soda fountains and the like.

It is an object of the present invention to provide a juice extractor of the character described in which the juice may be expressed from fruit in a convenient and speedy manner.

Another object of the invention is to provide a juice extractor the operating handle of which moves through an angle of only 90 degrees from completely open to completely closed position.

A further object of the invention is to provide a juice extractor in which the plunger bearing against the fruit is given both a vertical and a rotary motion by a single downward movement of an actuating handle.

Still another object of the invention is to provide a juice extractor of the character described in which continued movement of the actuating handle through its path of movement with a constant force produces increasingly greater pressure by the plunger against the fruit the juice of which is being extracted.

Still further objects of the invention are to provide a juice extractor which is simple in operation, durably constructed and pleasing in appearance.

Additional objects of the invention will be apparent from the following specification and drawings.

In the drawings, Figure 1 is an elevational view of a juice extractor according to the present invention with certain details of construction indicated by broken lines;

Figure 2 is a top plan view of the juice extractor shown in Figure 1;

Figure 3:
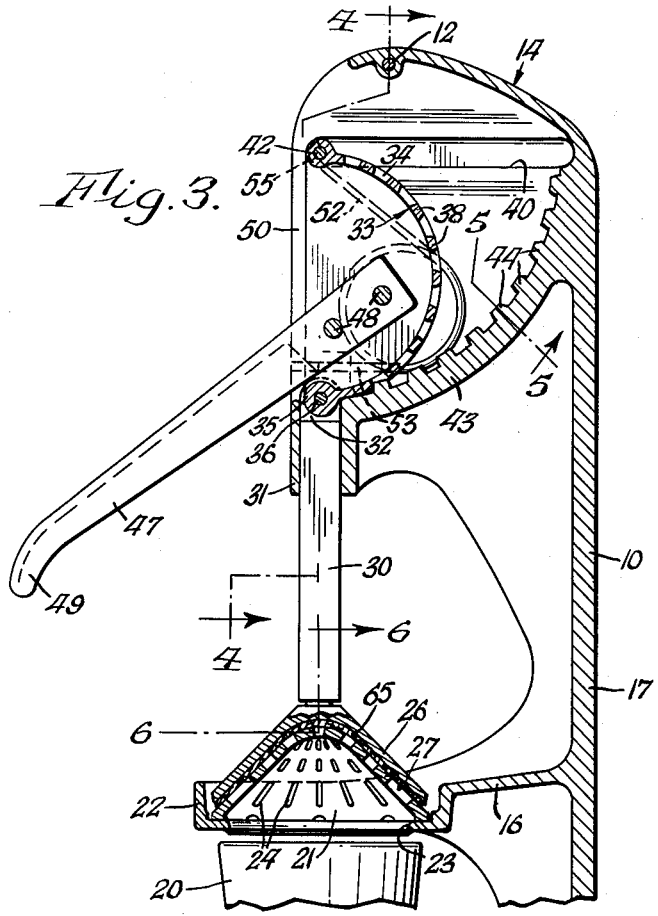
Figure 3 is a fragmentary vertical sectional view showing the operating mechanism of the extractor shown in Figures 1 and 2.
Figure 4:
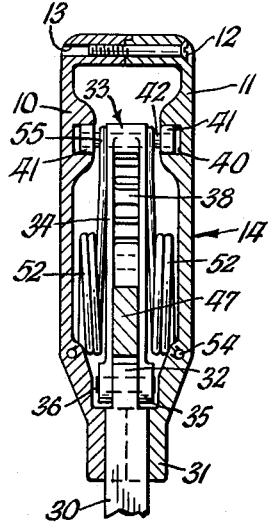
Figure 4 is a fragmentary vertical sectional view on line 4—4 of Figure 3.
Figure 6:
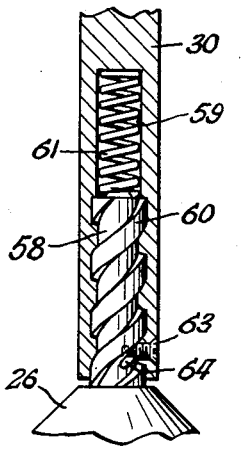
Figure 6 is an enlarged fragmentary vertical sectional view on line 6—6 of Figure 3.
Figure 5:
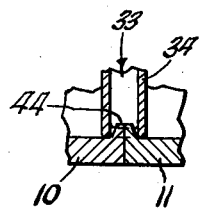
Figure 5 is a fragmentary sectional view on line 5—5 of Figure 3.

Referring to the drawings, the juice extractor of the present invention includes a pair of complementary castings 10 and 11 which are secured together to form a support by a plurality of elongated screws 12. Each of the screws 12 is received within one of the pairs of matching holes 13 which extend through the castings 10 and 11 and is threadedly engaged therein. The support formed by the castings 10 and 11 comprises four principal portions, a gear housing 14 at the upper end thereof, a base 15 at the bottom thereof, a supporting web 16 intermediate the gear housing and base, and a back 17. The base 15 extends laterally from the vertical back 17 of the extractor support and is provided with a plurality of downwardly extending spaced feet 18. A circular depression 19 adapted to receive the bottom of a glass or other receptacle 20 for the extracted juice is formed in the base 15.

A reamer 21 is carried by the supporting web 16 which extends laterally from the back 17 over the base 15. The reamer 21 is preferably hollow and of generally conical shape. The open larger end of the reamer rests in a cup-like portion 22 of the web 16 around a hole or opening 23 which is vertically aligned above the receptacle 20. A plurality of elongated holes or slots 24 are provided in the reamer 21 to permit the passage therethrough of extracted juice.

The reamer 21 is adapted to cooperate with a vertically movable plunger 26 in extracting juice from fruit, vegetables and the like pressed between them. The juice-expressing plunger 26 is preferably formed as a conical shell, the inner surface 27 of which has a shape corresponding to that of the outer surface of the conical reamer 21.

The plunger 26 depends from a rod 30 which is slidably mounted for vertical reciprocation in a guide 31. The latter is formed as a downwardly-projecting extension of the gear housing 14 and is centered over the reamer 21. The centers of the conical reamer 21 and the plunger 26 lie in the same vertical axis and the movement of the rod 30 and plunger 26 is along the same axis.

The upper end of the rod 30 is reduced to provide an axially extending tongue 32 which is attached to one end of a vertically disposed substantially semi-circular sector gear 33. Each of the spaced side plates 34 of the gear 33 terminates at one end in a perforated ear 35. The tongue 32 is inserted between the aligned ears and is retained in place by a pin or rivet 36 which passes through the tongue and the aligned perforations in the ears and permits relative rotational movement of the rod 30 and the gear 33. The semi-circular side plates 34 of the sector gear 33 are preferably parallel and are joined around the peripheries of the curved portions thereof by a plurality of spaced ribs 38 which constitute the teeth of the gear.

Each of the cast sections 10 and 11 are provided, adjacent its upper end, with a horizontally extending groove 40 so arranged that, when the castings are assembled to form the casing and support of the juice extractor, the grooves are in facing parallel relation on opposite sides of the interior of the gear housing 14. Each of the grooves 40 is adapted to receive a roller 41. The rollers 41 are rotatably mounted on the opposite ends of a pin 42 which extends transversely through the end of the sector gear 33 opposite from the end to which the rod 30 is attached.

Either of the plates 34 or the sector gear 33 as a whole may thus be considered a lever pivotally attached at one end to the rod 30 and having its other end guided or restrained for movement in a horizontal path.

It will be apparent by inspection of the drawings that by the described construction the sector gear 33 is adapted to move in a vertical plane from the position shown by broken lines in Figure 1 in which the straight side of the semi-circular gear is horizontal, with the rollers 41 on the pin 42 adjacent the back of the housing 14, and the rod 30 and plunger 26 are fully raised, to the position shown in Figure 3 in which the straight side of the semi-circular gear 33 is vertical, the rollers 41 are at the other ends of the grooves 40, and pressing upwardly therein and the rod 30 and plunger 26 are at the bottom of their stroke. In moving from one position to the other within the gear housing 14, the sector gear 33 meshes with a stationary, substantially quadrantal sector gear 43, the teeth 44 of which are preferably formed integrally with a wall of the gear housing 14, the teeth 38 of the movable gear 33 engaging between the teeth 44 of the stationary gear 43. A feature of the invention resides in the fact that the effective diameter of this stationary gear 43 is twice the effective diameter of the semi-circular sector gear 33.

An actuating handle 47 is attached to the sector gear 33 in any convenient way such as by the pair of rivets 48 passing through the side plates 34 and is adapted, by movement through a vertical angle of 90°, to move the gear 33 through the same angle. Simultaneously, the rollers 41 shift their position within the grooves 40 in the gear housing 14 in the manner described above. The handle 47 is preferably enlarged at its outer end to provide a convenient gripping portion 49 and is adapted to be guided in its vertical movement by engagement with the sides of a vertical slot 50 formed in the front of the gear housing 14.

A pair of coiled springs 52 are provided to maintain the handle 47 in raised position so that the plunger 26 is lifted from the reamer 21. Each of the springs 52 is provided with a straight end 53 which is inserted in a small hole 54 in the front wall of the gear housing 14. The other ends of each of the springs 52 are bent to form hooks 55 which engage the pin 42 on opposite sides of the sector gear 33 so that the reaction of the springs causes the sector gear 33 to normally occupy the position shown in broken lines in Figure 1.

The plunger 26 of the juice extractor is resiliently and rotatably carried at the lower end of the rod 30. A stem 58 which is preferably integral with the plunger 26 extends vertically upward from the smaller end of the plunger into an axial bore 59 in the lower end of the rod 30. The stem 58 is provided with a coarse helical cam-like thread 60 which fits and is received in a corresponding groove in the bore 59.

Between and bearing against the free end of the stem 58 and the inner end of the bore 59 there is provided a helical compression spring 61. The stem 58 is retained in the lower end of the rod 30 by a screw 63 located adjacent said end and extending through the wall of the bore 59. A slot 64 into which the inner end of the screw 63 extends is formed in the stem 58. The slot 64, being placed between the turns of the helical thread 60, is correspondingly helical but is made of limited length so that movement of the stem 58 outwardly from the bore 59 is restricted. Inward movement of the stem 58 is stopped by contact of the top of the plunger 26 with the end of the rod 30.

While the manner of operation of the juice extractor of the present invention will be apparent from the foregoing description, certain of the novel and convenient elements and features thereof will be pointed out in the following statement of operation.

With the parts in the position shown in Figure 1 which may be considered the normal position because of the biasing force exerted by the springs 52, the extractor is ready for use. When it is desired to extract the juice from a piece of a vegetable or fruit, such, for example, as a half of an orange, the fruit is placed with the cut side down on the reamer 21 and the actuating handle 47 is grasped with one hand and moved downwardly against the resistance of the springs 52.

Downward movement of the handle 47 produces pivotal movement of the sector gear 33 around the pin 42 which, as pointed out above, is supported by the rollers 41 in the opposed grooves 40 of the gear housing 14. The pivotal movement of the gear 33 caused by movement of the handle 47 results in downward movement of the rod 30 which is pivotally attached to the outer end thereof and thus moves the plunger 26 carried thereby closer to the reamer 21. At the same time pivotal movement of the gear 33 causes meshing of its teeth 38 with the teeth 44 of the stationary sector gear 43 formed integrally within the gear housing 14 and which is twice the effective diameter of the sector gear 33.

It will be observed that the arrangement of the teeth of the sector gear 43 in a quadrant and the teeth of the moving sector gear 33 in a semicircle while restricting movement of the opposite ends of the latter gear to paths arranged at right angles to each other keeps the gears in meshing position and causes the gear 33 to have a rolling downward and outward movement on the stationary gear 43 as the handle 47 is depressed. As indicated above, it is important that the sector gear 43 have twice the effective diameter of the sector gear 33.

It will also be observed that during movement of the sector gear 33 from the position shown in broken lines in Figure 1 to the position it occupies in Figure 3, the handle 47 and a portion of the sector gear 33 constitute one arm of a bent lever, the other arm of the lever being formed entirely by the sector gear 33. The free end of the latter arm terminates in the ears 35 which are attached by the pin or rivet 36 to the upper end of the vertically movable rod 30.

Initially the pin 42 forms the fulcrum of the bent lever but as the teeth of the sector gears are successively meshed during the rolling movement of the gear 33 on the gear 43, the fulcrum shifts and is located at the point of meshing. Since this point, during downward movement of the handle 47, approaches the pin or rivet 36 the arms of the lever continually decrease in length during downward movement of the handle. However, because of the greater original length of the lever arm comprising the handle 47, a constant force applied to the handle causes the exertion of an increasingly greater downward force on the rod 30 as the point of meshing approaches the rod. The mechanical advantage thus gained is balanced by the greater relative distance through which the handle 47 must be moved as the bottom of the stroke is approached. Calculations reveal that for each successive 22½ degrees traveled by the lever comprising the handle 47 during its downward movement the rod 30 moves downwardly approximately 38%, 33%, 25% and 4% respectively, of the total distance traveled by it between open and closed positions of the extractor. Thus during the initial closing movement when no resistance is encountered the movement of the rod 30 and plunger 26 is rapid while during the final squeezing or pressing the movement is small but great force is exerted so that the juice of the fruit is completely expressed. It will also be noted that the upward pressure of the plunger 30 on the sector gear 33 has a tendency to force this gear upwardly into disengagement with the teeth of the sector gear 43. This tendency is prevented and these gears kept in mesh by the rollers 41 riding in the horizontal grooves 40.

When, in its downward movement, the plunger 26 carried at the lower end of the rod 30 comes into contact with the fruit the fruit is compressed and the juice thereof is squeezed out. The juice passes through the slots 24 in the reamer 21 and drains into the receptacle 20. Seeds, pulp or portions of skin of the fruit do not pass readily, if at all, through the slots 24 and therefore are not deposited in the receptacle.

As previously explained, the stem 58 of the plunger 26 is axially movable within the bore 59 in the lower end of the rod 30 against the action of the spring 61. At the point in its downward movement when the resistance to compression of the fruit, designated in Figure 3 by the numeral 65, becomes sufficiently great to compress the spring 61 the stem 58 of the plunger moves upwardly in the bore 59. In so doing the plunger 26 is given a rotary movement because of the thread 60 on the stem 58. Such rotary movement results in the rotation of the fruit 65 on the reamer 21 and facilitates the extraction of the juice of the fruit by breaking the membranes or fibers therein.

When the handle 47 is permitted to return to raised position by the action of the springs 52 the spring 61 causes outward movement of the stem 58. The skin or other residue of the fruit remaining on the reamer 21 may then be removed and another piece of fruit may be placed in position for the extraction of juice. The reamer 21 is readily removable from the support 16 for cleaning when necessary and, if desired, the plunger 26 may quickly be removed for cleaning by loosening the screw 63 and unscrewing the stem 58 from the rod 30.

The juice extractor of the present invention is preferably constructed of metal. It is expected that in most cases a corrosion-resistant metal such as stainless steel, aluminum or alloys thereof will be employed for most of the parts. If desired a number of the parts may be formed of less corrosion-resistant metals which may be protected against the corrosive effects of the juices by suitable means.

The extractor is extremely convenient to operate since the handle operates through an arc of only 90° and the construction is such that greatly increased pressure can be exerted on the fruit during the final portion of the handle travel. As pointed out above, the juice extractor is also efficient in operation by reason of the combined pressing and turning of the fruit as its juice is extracted. The construction of the extractor is simple and the parts are of such a nature as not to be easily damaged or worn and thus to keep maintenance expense at a minimum.

The invention claimed is:

1. In a juice extractor of the character described having a support carried by said base, a squeezing element, a plunger adapted to be moved in a straight path toward and away from said squeezing element, a rod operatively attached to said plunger and movable therewith, and an actuating handle operatively connected to said rod, the combination therewith of means for producing movement of said plunger toward and away from said squeezing element comprising a pair of intermeshing sector gears, one of said gears being substantially semi-circular and being attached to said actuating handle and the other of said gears being stationary and substantially quadrantal and being carried by said support, said gears being contained within a gear housing carried by said support, grooves in said gear housing extending at right angles to the direction of movement of said plunger, said semi-circular gear having one end thereof pivotally attached to said rod and having its other end mounted for movement within said grooves, and resilient means operatively attached to said housing and to said semi-circular gear adapted to move said rod and plunger away from said squeezing element.

2. In a juice extractor of the character described having a support, a squeezing element, a plunger adapted to be moved in a straight path toward and away from said squeezing element, a rod operatively attached to said plunger and movable therewith, and an actuating handle operatively connected to said rod, the combination therewith of means for producing movement of said plunger toward and away from said squeezing element comprising a pair of intermeshing sector gears, one of said gears being substantially semi-circular and being attached to said actuating handle and the other of said gears being stationary and substantially quadrantal and being carried by said support and means compelling one end of said one of said gears to traverse a path extending perpendicularly to said rod.

3. In a juice extractor of the character described having a base, a support carried by said base, a squeezing element carried by said support, a plunger adapted to be moved in a straight path toward and away from said squeezing element, a rod operatively attached to said plunger and movable therewith, and an actuating handle operatively connected to said rod, the combination therewith of means for producing movement of said plunger toward and away from said squeezing element comprising a gear housing carried by said support, a pair of intermeshing sector gears within said housing, a pair of spaced parallel grooves in the opposite walls of said housing and extending at right angles to the direction of movement of said plunger, one of said gears being substantially semi-circular and having one end thereof pivotally attached to said rod and the other end thereof mounted for movement within said grooves, the other of said gears being stationary and substantially quadrantal and being carried by said housing, and said actuating handle being attached to said semi-circular gear.

4. In a juice extractor of the character described, the combination of a support, a squeezing element carried by said support, a plunger adapted to be moved in a straight path toward and away from said squeezing element, a rod guided by said support operatively attached to said plunger and movable therewith, and means for causing reciprocation of said rod, said means comprising a pair of intermeshing sector gears, one of said gears being fixedly carried by said support and the other of said gears having an effective diameter less than that of said one of said gears, the second-mentioned gear being pivotally attached at one end to the end of said rod distant from said plunger and having its other end guided for movement in a straight path normal to the path of said rod, and an actuating handle operatively attached to said second-mentioned gear.

5. In a juice extractor of the character described, the combination of a support, a squeezing element carried by said support, a plunger adapted to be moved in a straight path toward and away from said squeezing element, a rod operatively attached to said plunger and movable therewith, said rod being guided by said support, and means for causing reciprocation of said rod, said means comprising a pair of intermeshing sector gears, one of said gears being substantially semi-circular and the other of said gears being substantially quadrantal and stationary and being carried by said support, said semi-circular gear being pivotally attached at one end to the end of said rod distant from said plunger and having its other end guided by means associated with said support for movement in a straight path normal to the path of said rod, and an actuating handle attached to said semi-circular gear intermediate the ends of the latter.

References Cited in the file of this patent

UNITED STATES PATENTS

| Number | Name | Date |
|---|---|---|
| 73,771 | Borton | Jan. 26, 1868 |
| 349,179 | Ryan | Sept. 14, 1886 |
| 382,774 | Shea | May 15, 1888 |
| 399,229 | Scott | Mar. 5, 1889 |
| 931,831 | Zook | Aug. 24, 1909 |
| 968,345 | Hackney | Aug. 23, 1910 |
| 1,040,912 | Eubank | Oct. 8, 1912 |
| 1,437,860 | Pitman | Dec. 5, 1922 |
| 2,151,500 | Cecil | Mar. 21, 1939 |
| 2,160,523 | Scurlock | May 30, 1939 |
| 2,454,085 | Patrick | Nov. 16, 1948 |
| 2,497,335 | Wissner | Feb. 14, 1950 |
| 2,507,963 | Davitcho | May 16, 1950 |